(12) United States Patent
Bailey et al.

(10) Patent No.: US 10,124,719 B1
(45) Date of Patent: Nov. 13, 2018

(54) EMERGENCY VEHICLE LIGHT ARRAY

(71) Applicants: Roger P. Bailey, New Braunfels, TX (US); Dianne R. Bailey, New Braunfels, TX (US)

(72) Inventors: Roger P. Bailey, New Braunfels, TX (US); Dianne R. Bailey, New Braunfels, TX (US)

( * ) Notice: Subject to any disclaimer, the term of this patent is extended or adjusted under 35 U.S.C. 154(b) by 0 days.

(21) Appl. No.: 15/835,003

(22) Filed: Dec. 7, 2017

Related U.S. Application Data

(60) Provisional application No. 62/431,144, filed on Dec. 7, 2016.

(51) Int. Cl.

| | |
|---|---|
| *B60Q 1/26* | (2006.01) |
| *B60Q 1/52* | (2006.01) |
| *F21S 43/14* | (2018.01) |
| *F21V 14/04* | (2006.01) |
| *F21S 4/28* | (2016.01) |
| *B60Q 7/00* | (2006.01) |
| *B60R 11/04* | (2006.01) |
| *F21W 107/00* | (2018.01) |
| *F21Y 101/00* | (2016.01) |
| *F21Y 115/10* | (2016.01) |
| *G08G 1/0965* | (2006.01) |

(52) U.S. Cl.
CPC .......... *B60Q 1/2657* (2013.01); *B60Q 1/2611* (2013.01); *B60Q 1/52* (2013.01); *B60Q 7/00* (2013.01); *F21S 4/28* (2016.01); *F21S 43/14* (2018.01); *F21V 14/04* (2013.01); *B60R 11/04* (2013.01); *F21W 2107/00* (2018.01); *F21Y 2101/00* (2013.01); *F21Y 2115/10* (2016.08); *G08G 1/0965* (2013.01)

(58) Field of Classification Search
CPC ...... B60Q 1/2657; B60Q 1/2611; B60Q 1/52; B60Q 7/00; B60Q 11/04; F21V 14/04; F21S 4/28; F21W 2107/00; F21Y 2101/00; F21Y 2115/10; G08G 1/0965
See application file for complete search history.

(56) References Cited

U.S. PATENT DOCUMENTS

| | | | |
|---|---|---|---|
| 3,579,184 A * | 5/1971 | Forestal | B60Q 1/2611 340/470 |
| 3,949,218 A | 4/1976 | Hayward | |
| 4,259,660 A | 3/1981 | Oliver | |
| 4,835,515 A | 5/1989 | McDermott et al. | |
| 5,122,797 A | 6/1992 | Wanasz | |
| 5,203,621 A | 4/1993 | Weinmeister et al. | |
| 6,337,623 B1 * | 1/2002 | Krugh, IV | B60Q 1/2611 340/433 |
| 6,809,654 B2 | 10/2004 | Hudson | |
| 2005/0047167 A1 * | 3/2005 | Pederson | B60Q 1/2611 362/542 |

(Continued)

*Primary Examiner* — Ali Alavi
(74) *Attorney, Agent, or Firm* — Cramer Patent & Design, PLLC; Aaron R. Cramer

(57) ABSTRACT

A light bar assembly includes a base; a motor; an elevating mechanism, each in operable communication with the motor; and a light bar affixed to the elevating mechanism such that the elevating mechanism raises and lowers the light bar relative to the vehicle. The elevating mechanism is configured to be securely mounted to a roof of a vehicle. The motor and the light bar are each configured to be in electrical communication with an on-board power supply of the vehicle.

4 Claims, 5 Drawing Sheets

(56) References Cited

U.S. PATENT DOCUMENTS

| | | | |
|---|---|---|---|
| 2005/0057941 A1* | 3/2005 | Pederson | B60Q 1/2611 362/542 |
| 2012/0113666 A1* | 5/2012 | Slipp | B60Q 1/2611 362/523 |
| 2013/0194090 A1 | 8/2013 | McLoughlin et al. | |
| 2013/0208494 A1* | 8/2013 | Jones | B60Q 1/2611 362/526 |
| 2016/0167572 A1 | 6/2016 | Kim | |

* cited by examiner

EMERGENCY VEHICLE LIGHT ARRAY

RELATED APPLICATIONS

The present invention was first described in and claims the benefit of U.S. Provisional Application No. 62/431,144 filed Dec. 7, 2016, the entire disclosures of which are incorporated herein by reference.

FIELD OF THE INVENTION

The present invention relates to emergency vehicles and, more particularly, to height-adjustable emergency vehicle light array configured to be mounted to the roof of an emergency vehicle.

BACKGROUND OF THE INVENTION

Police officers and other emergency response personnel put their lives on the line every day, facing a multitude of situations that pose a myriad of threats to their well-being. Often these threats are from law-abiding citizens who simply do not see them due to night time hours, poor weather conditions, high sun glare, or other instances of inadequate lighting. One (1) particular situation that results in decreased visibility for stopped emergency vehicles occurs when the vehicle is stopped on a hilly road. As the road itself blocks visibility of the vehicle as well as emergency lights, oncoming motorists often do not see the vehicle until cresting the hill, perhaps only feet from the vehicle. By the time the driver reacts, it is often too late, resulting in a tragic accident and perhaps even death. Accordingly, there exists a need for a means by which stopped emergency vehicles on hilly roads can be provided with increased visibility for oncoming motor vehicles.

SUMMARY OF THE INVENTION

The inventor has recognized the aforementioned, inherent problems and lack in the art and observed that there is a need for an elevating enhanced light bar for emergency vehicles. The development of the present invention, which will be described in greater detail herein, fulfills this need.

In an embodiment, the disclosed light bar assembly includes a base; a motor; at least one elevating mechanism, each in operable communication with the motor; and a light bar affixed to each elevating mechanism. The elevating mechanism is configured to be securely mounted to a roof of a vehicle. The motor and the light bar are each configured to be in electrical communication with an on-board power supply of the vehicle.

In another embodiment, the disclosed light bar assembly for an emergency vehicle includes a mounting channel; a drive mechanism mounted to the mounting channel; an elevating mechanism operatively coupled with the drive mechanism; and a light bar connected to the elevating mechanism. Operation of the drive mechanism extends the elevating mechanism into an elevated position and lowers the elevating mechanism into a lowered position.

In an embodiment, the disclosed emergency vehicle includes a vehicle body including a roof; a mounting channel connected to the roof; a drive motor; a screw drive shaft rotatably coupled to the mounting channel and operatively coupled to the motor, wherein the motor is operable to rotate the screw drive shaft in a first direction and a second direction, opposite the first direction; a threaded coupling movably coupled to the screw drive shaft, wherein the threaded coupling is linearly moveable along the screw drive shaft in response to rotation of the screw drive shaft; a scissor-style elevating mechanism connected to the threaded coupling, wherein linear movement of the threading coupling in a first direction along the screw drive shaft moves the elevating mechanism into an elevated position and linear movement of the threading coupling in a second direction, opposite the first direction, along the screw drive shaft moves the elevating mechanism into a lowered position; a light bar connected to the elevating mechanism, wherein the light bar includes a light array extending from one end of the light bar to another end of the light bar; a loud speaker; a rotatable search light; and a camera including at least one of an image capture camera, a video capture camera and a night vision camera; a multifunctional display communicatively coupled with the camera; and a control module operatively coupled with the light bar and the drive motor.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
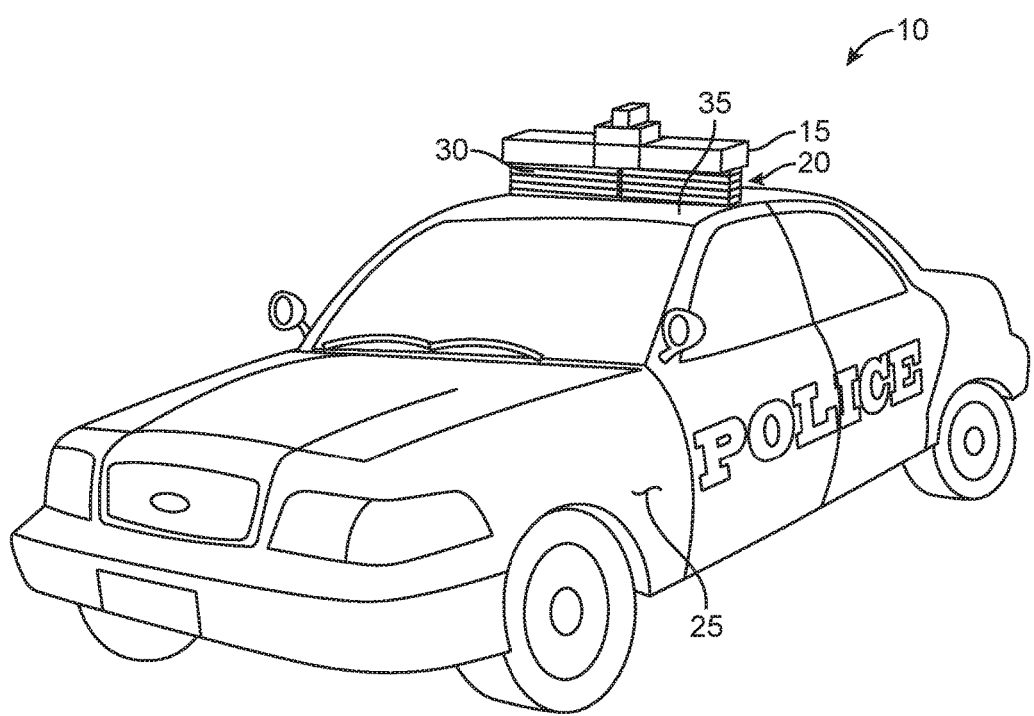
FIG. 1 is a perspective view of an embodiment of the disclosed light bar assembly, shown installed on a vehicle in a lowered and stowed position.

DESCRIPTIVE KEY 10 light bar assembly
15 light bar
20 elevating mechanism
25 emergency vehicle
30 cross member
35 vehicle roof
40 mechanical fastener
45 lower mounting channel
50 reversible DC motor
55 dual screw drive shaft
60 threaded coupling
65 raised distance "d"
70 interconnecting wiring
75 hilly road
80 overall outward view
85 peripheral item
90 crest 95 valley
100 extended light array
105 loud speaker
110 rotating high intensity search light
115 video camera with night vision capability
120 multifunction display
125 image display panel
130 control switch

DETAILED DESCRIPTION OF THE PREFERRED EMBODIMENT

In accordance with the invention, the best mode is presented in terms of the illustrative example embodiments, herein depicted within FIGS. 1-5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

As used herein, the singular terms "a," "an," and "the" include plural referents unless the context clearly dictates otherwise. Thus, for example, reference to an object can include multiple objects unless the context clearly dictates otherwise.

As used herein, the terms "couple," "coupled," "connect," "connected," and "connection" refer to a coupling or linking. Connected objects can be directly coupled to one (1) another or can be indirectly coupled to one another, such as via another object.

As used herein, the terms "first," "second," etc. are used merely as labels and do not impose any positional or hierarchical requirements on the item to which the term refers.

In the following description, various illustrative embodiments of the disclosed light bar assembly are provided, which may be practiced without some or all of the particular elements associated with any one of the disclosed embodiments. In some instances, details of known devices and/or processes have been omitted to avoid unnecessarily obscuring the disclosure. While some examples will be described in conjunction with specific illustrated embodiments, these examples are not intended to be limiting. As such, reference herein to "an embodiment," "another embodiment," "an example," and "another example" means that one (1) or more element described in connection with that embodiment or example is included in at least one (1) implementation of the disclosed electrical junction box.

Referring generally to FIGS. 1-5, disclosed is a light bar assembly, generally referred to herein as the assembly 10, where like reference numerals represent similar or like parts. Generally, the disclosed assembly 10 is configured to be installed on or otherwise operatively mounted to an emergency vehicle 25. The assembly 10 is provided with several enhancements that are not typically found on conventional light bars, which will be described in greater detail herein below. In various embodiments, the assembly 10 includes a light bar 15 that is physically connected to at least one (1) elevating mechanism 20, which is installed upon the emergency vehicle 25. In some embodiments, the assembly 10 includes two (2) elevating mechanisms that support the light bar 15 on a vehicle roof 35 of the emergency vehicle 25.

Figure 2:
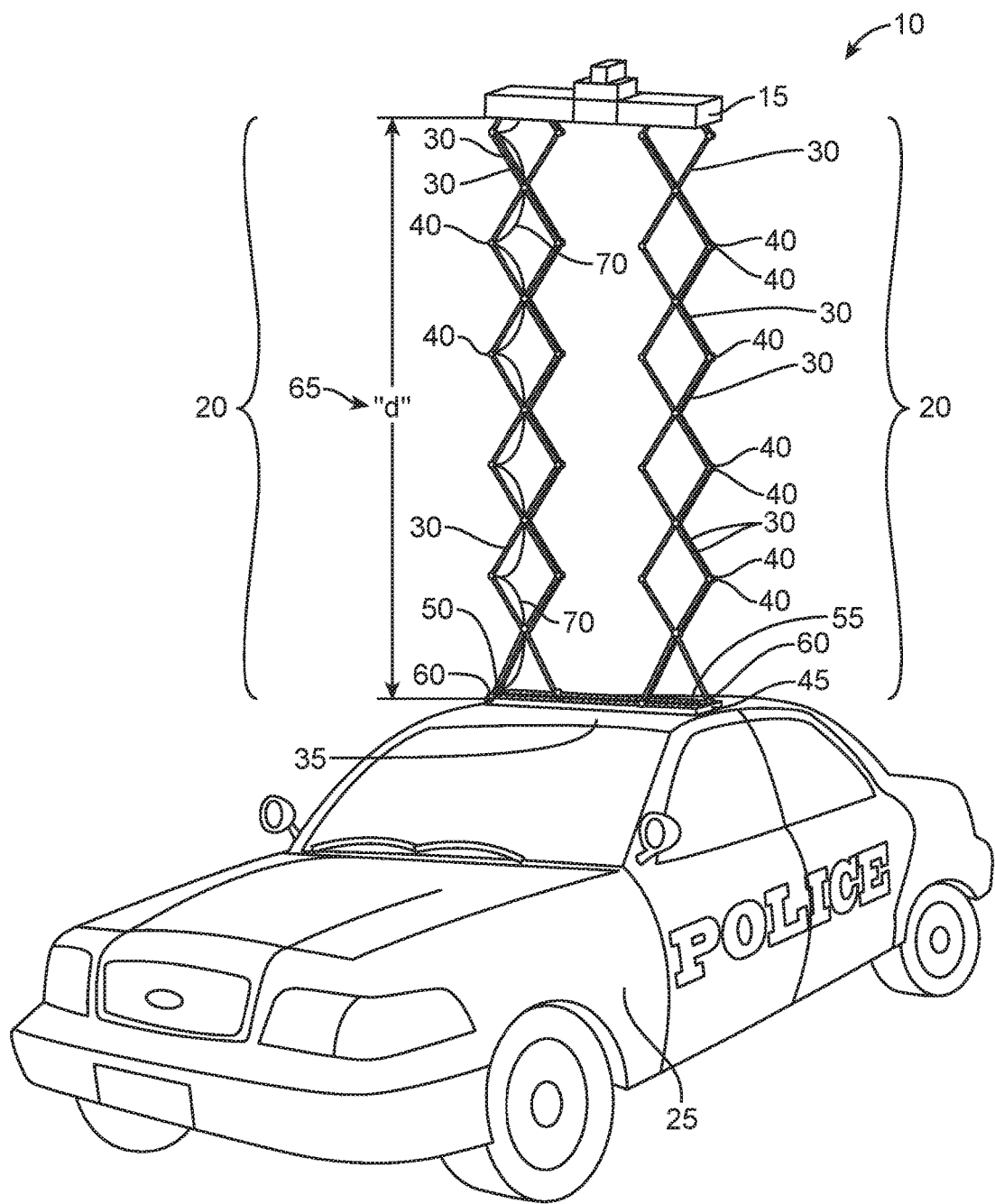
FIG. 2 is a perspective view of an embodiment of the disclosed light bar assembly, shown installed on a vehicle in an elevated and utilized position.

Referring to FIGS. 1 and 2, in an embodiment of the disclosed assembly 10, each elevating mechanism 20 includes a scissor-style mechanism, for example, with a minimum of three (3) sections formed from a series of cross members 30 that are dimensioned so as to fit in a collapsed state on the vehicle roof 35. For example, the elevating mechanism 20 is envisioned to attain a minimum of six feet (6 ft.) when in the elevated and utilized position, as illustrated in FIG. 2. In the illustrative example, the assembly 10 includes dual elevating mechanisms 20, in a side-by-side orientation, for stability enhancement. Although other configurations are possible, and as such, the restriction to one (1) particular style or configuration should not be interpreted as a limiting factor. Any particular dimension, size, quantity, or configuration of the cross members 30, is also not intended to be a limiting factor, as various configurations may require various dimensions.

In an exemplary embodiment, when the light bar 15 is extended up to one-third (⅓) of the limit of the extension of each elevating mechanism 20, the assembly 10 maintains its secure attachment to the vehicle roof 35 with the vehicle 25 reaching vehicle speeds up to approximately eighty miles per hour (80 mph). When the light bar 15 is extended up to two-thirds (⅔) of the limit of extension of each elevating mechanism 20, the assembly 10 maintains its secure attachment to the vehicle roof 35 with the vehicle 25 reaching vehicle speeds up to approximately fifty miles per hour (50 mph). When the light bar 15 is fully extended to the limit of extension of each elevating mechanism 20, the assembly 10 maintains its secure attachment to the vehicle roof 35 with the vehicle 25 reaching vehicle speeds up to approximately thirty miles per hour (30 mph). When not deployed, the assembly 10 may be fully secured to the vehicle roof 35 at the limit of speed the vehicle 25 can achieve.

In the illustrative examples, the emergency vehicle 25 is depicted as a typical police sedan for purposes of illustration, however other types of emergency vehicles such as fire trucks, rescue squads, ambulances, tow truck, utility service vehicles, assistance vehicles, government vehicles, military vehicles or the like would benefit from the teachings of the present disclosure, thus the particular depiction of any type of emergency vehicle 25 should not be interpreted as a limiting factor. In various implementations, the electrical and mechanical connection from the emergency vehicle 25 to the assembly 10 can be made through the vehicle roof 35, for example, in a manner substantially similar to the electrical and mechanical connections utilized with conventional light bars.

The various sections of cross members 30 are interconnected with mechanical fasteners 40, such as bolts or rivets, to allow for the raised position, as shown in FIG. 2, but to still allow for structural rigidity. A lower mounting channel 45 remains permanently affixed to the vehicle roof 35. A lower mounting channel 45 is connected to the vehicle roof 35 and supports a reversible DC motor 50 that is directly coupled in an axial manner to a dual screw drive shaft 55 that runs the length of the lower mounting channel 45. The two (2) lowest cross members 30, are provided with a threaded coupling 60 that rides along the dual screw drive shaft 55. Thus, as the dual screw drive shaft 55 is rotated in one (1) direction by the reversible DC motor 50, the threaded coupling 60 will travel to the center of the vehicle roof 35 (e.g., the center of the dual screw drive shaft 55 that runs the length of the lower mounting channel 45), thus moving the cross members 30 into a more vertical or extended position, as shown in FIG. 2. Similarly, as the dual screw drive shaft 55 is rotated in the opposite direction by the reversible DC motor 50, the threaded coupling 60 will each travel to the outer edges of the vehicle roof 35 (e.g., the outer ends of the dual screw drive shaft 55 that runs the length of the lower mounting channel 45), thus moving the cross members 30 into a more horizontal or lowered position, as shown in FIG. 1.

When the elevating mechanism 20 is in the maximum raised position, the nearly vertical orientation of the cross members 30 will result in a maximum raised distance "d" 65 (FIG. 2). For example, multiple deployed segments of cross members 30 will result in a raised distance "d" 65 of approximately sixteen feet (16 ft.) above the vehicle roof 35. It should be noted that other distances and lengths could be provided by varying the size and/or quantity of the cross members 30 and, as such, should not be interpreted as a limiting factor.

In various embodiments of the assembly 10, the cross members 30 may be made of tubular or angular stock metal such as steel, aluminum, stainless steel, or the like with appropriate corrosion resistance finish.

Interconnecting wiring 70 is routed along or inside the cross members 30 of one (1) of the elevating mechanisms 20, as illustrated by example in FIG. 2. The interconnecting wiring 70 is used to connect electrical components inside of the light bar 15 to a power source and control unit of the emergency vehicle 25.

Figure 3:
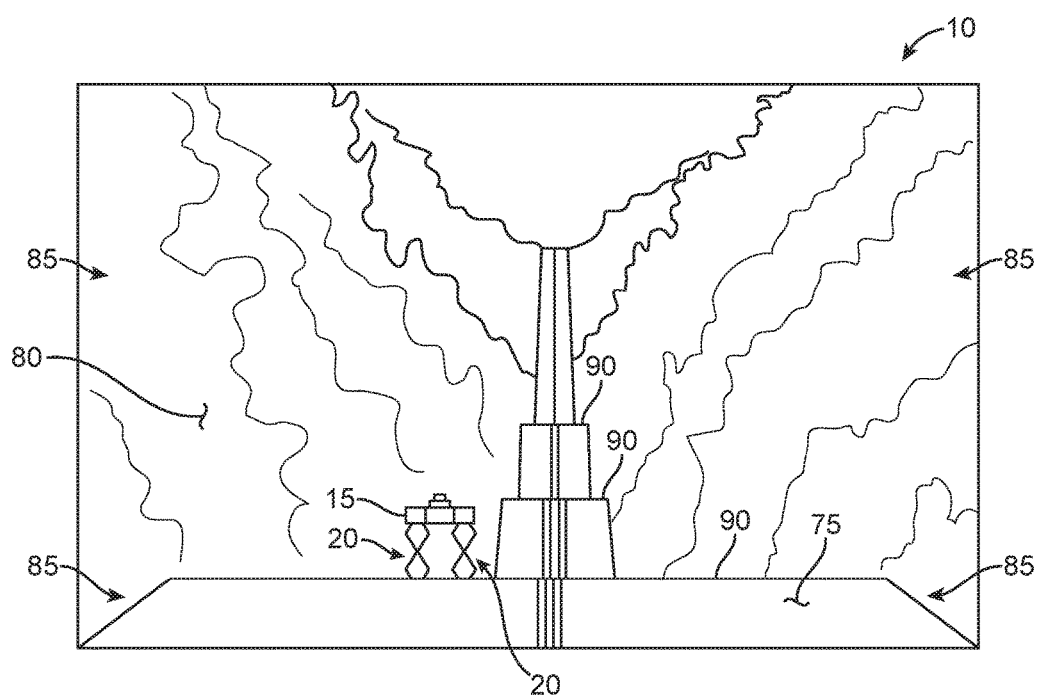
FIG. 3 is a schematic environmental illustration of an example of the disclosed light bar assembly being utilized on a hilly road.

FIG. 3 illustrates an overall outward view 80 of what would typically be seen through a windshield of an oncoming motor vehicle heading toward the emergency vehicle 25 having the disclosed assembly 10 installed on the roof 35 of the emergency vehicle, as illustrated in FIGS. 1 and 2. As such, the example view 80 may include the hilly road 75 and peripheral items 85 such as the berm, the horizon, roadside vegetation, and the like. The hilly road 75 includes crests 90 and valleys 95. In this representative view, the emergency vehicle 25 (not visible due to illustrative limitations) is located in one (1) of the valleys 95 and is thus not visible in the overall outward view 80 as would be seen by an oncoming motorist. However, the light bar 15 atop the elevating mechanism(s) 20 is visible and would thus alert the motorist to one (1) or more vehicles as well as possible individuals who may be in the hilly road 75. Such notification would not be possible without the advanced warning capabilities of the disclosed assembly 10.

Figure 4:
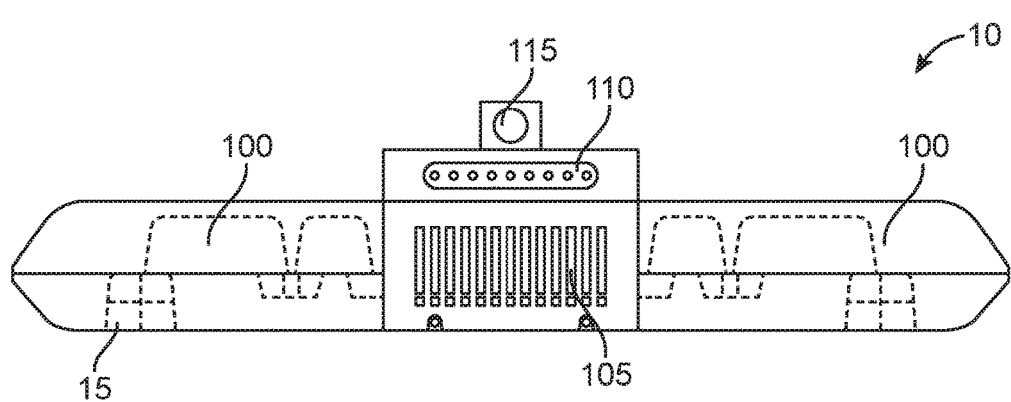
FIG. 4 is a schematic, elevation view of an embodiment of the disclosed light bar assembly; and, FIG. 5 is a schematic, elevation view of an embodiment of a multifunction display of the disclosed light bar.

Referring to FIG. 4, an embodiment of the light bar 15 of the disclosed assembly 10 includes an extended light array 100 that is located on both forward and rear surfaces of the light bar 15. The extended light array 100 may made available in a wide variety of colors such as red, blue, yellow, green, white or any combination thereof to suit the type of emergency vehicle 25 (FIGS. 1 and 2). At an approximate center of the light bar 15 is a loud speaker 105 for purposes of a siren or a public address system. Located atop the loud speaker 105 is rotating high intensity search light 110 that can be controlled with regards to ON/OFF function as well as direction by the operator. Additionally, a video camera with night vision capability 115 is located atop the rotating high intensity search light 110 for the purposes of recording and/or transmitting captured images from the immediate area surrounding the light bar 15. Further detail on the image capture functionality will be provided herein below.

Figure 5:
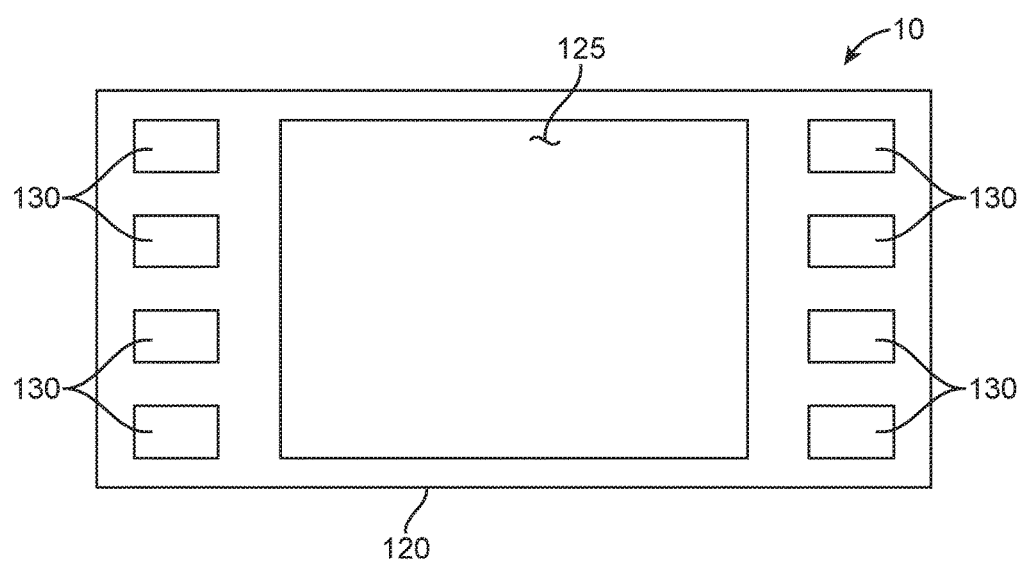

Referring to FIG. 5, an embodiment of the disclosed assembly 10 also includes a multifunction display 120 that includes an image display panel 125 for purposes of viewing the output of the video camera with night vision capability 115 (FIG. 4) thus allowing the operator of the assembly 10 to see above oncoming obstacles, such as on the hilly road 75 (FIG. 3). The multifunction display 120 also provides the ability to transmit the image displayed by the image display panel 125 along with voice to another location via an RF transmitter, cellular link, Wi-Fi link, or the like. The multifunction display 120 provides a plurality of control switches 130 along its outside perimeter for controlling all functionality of the assembly 10 including, but not limited to; operation of the extended light array 100, operation of the loud speaker 105, operation and direction of the rotating high intensity search light 110, operation and direction of the video camera with night vision capability 115, operation of the image display panel 125, raising, lowering, and positioned height of the elevating mechanism 20, and the like.

In an example method of use, the disclosed assembly 10 can be utilized in a simple and effortless manner with little or no training. It is envisioned that the assembly 10 would be constructed, installed and utilized with the emergency vehicle 25 in general accordance with FIGS. 1-5.

In an example implementation, after procurement of the assembly 10, it would be installed on a typical emergency vehicle 25 following conventional practices. Electrical power for the invention, envisioned to be either 12-VDC or 24-VDC would be obtained from the electrical supply of the emergency vehicle 25. The interconnecting wiring 70 would be routed from the light bar 15 to the multifunction display 120 as required. After testing, the assembly 10 is ready for use.

During use of the assembly 10, the operator of an emergency vehicle 25 would arrive at the scene of an incident. Should the incident be located on or near a hilly road 75, the operator would raise the light bar 15 using the elevating mechanism(s) 20 until a suitable safe height is obtained. Other components of the light bar 15 such as the extended light array 100, the loud speaker 105, the rotating high intensity search light 110, and/or the video camera with night vision capability 115 would be operated in a conventional manner to ensure safety for all at the scene of an incident. Upon completion at the incident scene, the components of the assembly 10 would be deactivated and the light bar 15 lowered back to the vehicle roof 35, thus completing the operating cycle and readying the assembly 10 for future use in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A light bar assembly, comprising:
a base, comprising a motor;
at least one elevating mechanism, each in operable communication with said motor;
a light bar affixed to each elevating mechanism; and,
a display in electrical communication with said video camera, capable of being mounted within said vehicle;
wherein said elevating mechanism is configured to be securely mounted to a roof of a vehicle;
wherein said motor and said light bar are each configured to be in electrical communication with an on-board power supply of said vehicle;

wherein said light bar further comprises a video camera with night vision capability; and, wherein:
said display is in wireless communication with a remote control module;
said display is operable to transmit video images to said remote control module; and
said display is operable to control for controlling said light bar.

2. The assembly of claim 1, wherein each elevating mechanism further comprises a scissor-style mechanism.

3. The assembly of claim 1, wherein said light bar further comprises a loud speaker.

4. An emergency vehicle, comprising:
a vehicle body comprising a roof;
a mounting channel connected to said roof;
a drive motor;
a screw drive shaft rotatably coupled to said mounting channel and operatively coupled to said motor, wherein said motor is operable to rotate said screw drive shaft in a first direction and a second direction, opposite said first direction;
a threaded coupling movably coupled to said screw drive shaft, wherein said threaded coupling is linearly moveable along said screw drive shaft in response to rotation of said screw drive shaft;
a scissor-style elevating mechanism connected to said threaded coupling, wherein linear movement of said threading coupling in a first direction along said screw drive shaft moves said elevating mechanism into an elevated position and linear movement of said threading coupling in a second direction, opposite said first direction, along said screw drive shaft moves said elevating mechanism into a lowered position;
a light bar connected to said elevating mechanism, wherein said light bar comprises:
a light array extending from one end of said light bar to another end of said light bar;
a loud speaker;
a rotatable search light; and,
a camera, comprising at least one of an image capture camera, a video capture camera and a night vision camera;
a multifunctional display communicatively coupled with said camera, wherein said multifunctional display is one of wirelessly coupled or wired to said camera; and,
a control module operatively coupled with said light bar and said drive motor, wherein said control module is one of wirelessly coupled or wired to each one of said light bar and said drive motor to control operation thereof.

* * * * *